UNITED STATES PATENT OFFICE.

GUY C. GIVEN AND ROBERT H. BARTEAUX, OF TAMAQUA, PENNSYLVANIA, ASSIGNORS TO ATLAS POWDER COMPANY, OF WILMINGTON, DELAWARE, A CORPORATION OF DELAWARE.

PROCESS FOR SEPARATING SODIUM NITRATE AND POTASSIUM NITRATE.

1,294,788.  Specification of Letters Patent.  Patented Feb. 18, 1919.

No Drawing.  Application filed July 11, 1918.  Serial No. 244,412.

*To all whom it may concern:*

Be it known that we, GUY C. GIVEN and ROBERT H. BARTEAUX, citizens of the United States, residing at Tamaqua, in the county of Schuylkill and State of Pennsylvania, have invented certain new and useful Improvements in Processes for Separating Sodium Nitrate and Potassium Nitrate, of which the following is a specification.

This invention relates to a process for separating sodium nitrate and potassium nitrate. So far as we are aware no method has hitherto been known by which small amounts of potassium nitrate could be separated from large amounts of sodium nitrate. We have discovered that if a solution of the two salts is allowed to evaporate under reduced pressure, at a temperature between 85 and 95 degrees centigrade the separation of the two salts may be readily effected.

Our process depends, in large measure, upon the fact, which we have discovered, that while a solution of sodium and potassium nitrates when boiled under atmospheric pressure attains a temperature such as to prevent the ready separation of the two salts because the temperature is above that of the desired relative solubility of the salts, a solution of said salts evaporated under reduced or below atmospheric pressure permits the temperature to be maintained at such a point as to render possible the separation of the sodium nitrate as a solid leaving the potassium nitrate in solution.

When a solution of the two salts is evaporated under reduced pressure, for example under a vacuum between sixteen and twenty-four inches of mercury and at a temperature between 85 and 95 degrees centigrade a solution is formed which contains a larger quantity of potassium nitrate than sodium nitrate and from this solution the potassium nitrate can be readily separated. The separation of potassium nitrate from the solution after removal of the sodium nitrate, as described, is effected by merely cooling to atmospheric temperature, twenty degrees centigrade, after the addition of a sufficient quantity of water so that the ratio of water to sodium nitrate is the same as that which obtains in a water solution saturated with sodium nitrate and potassium nitrate at the removal temperature.

An example of the manner of practising our process is as follows. If a solution containing 10 percentum of potassium nitrate and 35 percentum of sodium nitrate be evaporated under the conditions above named the sodium nitrate will decrease in proportion to the potassium nitrate in the solution until the latter remains in excess, whereupon the potassium nitrate is separated from the remaining solution.

It is not to be understood that the invention is limited to the employment of the particular proportions or the particular percentages named because these may be varied and consequently it is to be understood that the invention includes within its purview whatever changes fairly come within the scope of the appended claims.

Having described our invention what we claim is:

1. The herein described process for the separation of sodium nitrate from potassium nitrate by the evaporation of a solution of the two salts at reduced pressure and at a temperature between 80 and 95 degrees centigrade and the subsequent separation of the potassium nitrate from the sodium nitrate.

2. The herein described process for the separation of sodium nitrate from potassium nitrate which consists of evaporating a solution of the two salts wherein the sodium nitrate is in materially greater quantity than the potassium nitrate, at less than atmospheric pressure and at a temperature above normal and then separating the potassium nitrate from the sodium nitrate.

3. The herein described process for the separation of sodium nitrate from potassium nitrate which consists of evaporating a solution of the two salts wherein the sodium nitrate is in materially greater quantity than the potassium nitrate, at a temperature between 80 and 95 degrees centigrade and at a reduced pressure and then separating the potassium nitrate from the sodium nitrate.

4. The herein described process for the separation of sodium nitrate from potassium nitrate by the evaporation of a solution of the two salts, under a vacuum varying between sixteen and twenty-four inches of mercury, and a temperature of solution between 80 and 95 degrees centigrade and then separating the potassium nitrate from the sodium nitrate.

5. The herein described process for the separation of sodium nitrate from potassium nitrate by evaporation of a solution containing the two salts and wherein the sodium nitrate is in excess of the potassium nitrate at a temperature between 85 and 95 degrees centigrade at a reduced pressure, separating the crystalline sodium nitrate at this temperature and separating the potassium nitrate from the liquid containing the same.

In testimony whereof we affix our signatures in the presence of two witnesses.

GUY C. GIVEN.
ROBERT H. BARTEAUX.

Witnesses:
J. T. POWER,
W. L. CRAIG.